United States Patent
Rozbicki (10) Patent No.: US 10,320,231 B2
(45) Date of Patent: Jun. 11, 2019

(54) WIRELESS POWERED ELECTROCHROMIC WINDOWS

(71) Applicant: View, Inc., Milpitas, CA (US)

(72) Inventor: Robert T. Rozbicki, Germantown, TN (US)

(73) Assignee: View, Inc., Milpitas, CA (US)

( * ) Notice: Subject to any disclaimer, the term of this patent is extended or adjusted under 35 U.S.C. 154(b) by 304 days.

(21) Appl. No.: 14/962,975

(22) Filed: Dec. 8, 2015

(65) Prior Publication Data

US 2016/0091769 A1    Mar. 31, 2016

Related U.S. Application Data (63) Continuation of application No. 14/735,016, filed on Jun. 9, 2015, now Pat. No. 9,664,976, which is a
(Continued)

(51) Int. Cl.
| | |
|---|---|
| *H01F 27/42* | (2006.01) |
| *H02J 50/10* | (2016.01) |
| *H02J 50/12* | (2016.01) |
| *H02J 50/50* | (2016.01) |
| *H02J 50/30* | (2016.01) |
| *H02J 50/20* | (2016.01) |

(Continued)

(52) U.S. Cl.
CPC .............. *H02J 50/10* (2016.02); *E06B 9/24* (2013.01); *G02F 1/153* (2013.01); *G02F 1/163* (2013.01); *H02J 5/005* (2013.01); *H02J 7/025* (2013.01); *H02J 50/12* (2016.02); *H02J 50/20* (2016.02); *H02J 50/30* (2016.02); *H02J 50/50* (2016.02); *E06B 2009/2464* (2013.01)

(58) Field of Classification Search
CPC . G02F 1/163; H02J 5/005; H02J 50/30; H02J 7/025; E06B 9/24; E06B 2009/2464
See application file for complete search history.

(56) References Cited

U.S. PATENT DOCUMENTS

| | | | |
|---|---|---|---|
| 4,129,861 A | 12/1978 | Giglia | |
| 5,384,653 A * | 1/1995 | Benson | E06B 3/6722 |
| | | | 359/265 |

(Continued)

FOREIGN PATENT DOCUMENTS

| | | |
|---|---|---|
| EP | 1995845 A2 | 11/2008 |
| EP | 2357544 | 8/2011 |

(Continued)

OTHER PUBLICATIONS

U.S. Appl. No. 14/951,410, filed Nov. 24, 2015 entitled Self-Contained EC IGU.

(Continued)

*Primary Examiner* — Jared Fureman
*Assistant Examiner* — Duc M Pham
(74) *Attorney, Agent, or Firm* — Weaver Austin Villeneuve & Sampson LLP; Brian D. Griedel (57) ABSTRACT

Electrochromic windows powered by wireless power transmission are described, particularly, the combination of low-defectivity, highly-reliable solid state electrochromic windows with wireless power transmission. Wireless power transmission networks which incorporate electrochromic windows are described.

33 Claims, 6 Drawing Sheets

Related U.S. Application Data continuation of application No. 12/971,576, filed on Dec. 17, 2010, now Pat. No. 9,081,246.

(60) Provisional application No. 61/289,319, filed on Dec. 22, 2009.

(51) Int. Cl.
| | |
|---|---|
| *H02J 7/02* | (2016.01) |
| *G02F 1/163* | (2006.01) |
| *H02J 5/00* | (2016.01) |
| *E06B 9/24* | (2006.01) |
| *G02F 1/153* | (2006.01) |

(56) References Cited

U.S. PATENT DOCUMENTS

| | | | |
|---|---|---|---|
| 5,416,617 A | 5/1995 | Loiseaux et al. | |
| 6,055,089 A * | 4/2000 | Schulz | G02F 1/163 136/251 |
| 6,407,847 B1 | 6/2002 | Poll et al. | |
| 6,897,936 B1 | 5/2005 | Li et al. | |
| 7,133,181 B2 | 11/2006 | Greer et al. | |
| 7,382,636 B2 | 6/2008 | Baarman et al. | |
| 7,994,880 B2 | 8/2011 | Chen et al. | |
| 8,149,756 B2 | 4/2012 | Hottinen | |
| 8,976,440 B2 | 3/2015 | Berland et al. | |
| 9,081,246 B2 | 7/2015 | Rozbicki | |
| 9,128,346 B2 | 9/2015 | Shrivastava et al. | |
| 9,170,008 B2 | 10/2015 | Reul et al. | |
| 9,300,581 B1 | 3/2016 | Hui et al. | |
| 9,436,055 B2 | 9/2016 | Shrivastava et al. | |
| 9,442,338 B2 | 9/2016 | Uhm et al. | |
| 9,442,341 B2 | 9/2016 | Shrivastava et al. | |
| 9,664,976 B2 | 5/2017 | Rozbicki | |
| 9,690,174 B2 | 6/2017 | Wang | |
| 9,709,869 B2 | 7/2017 | Baumann et al. | |
| 9,740,074 B2 | 8/2017 | Agrawal et al. | |
| 9,778,533 B2 | 10/2017 | Bertolini | |
| 9,946,138 B2 | 4/2018 | Shrivastava et al. | |
| 2002/0149829 A1 | 10/2002 | Mochizuka et al. | |
| 2003/0227663 A1 | 12/2003 | Agrawal et al. | |
| 2006/0018000 A1 | 1/2006 | Greer | |
| 2006/0107616 A1 | 5/2006 | Ratti et al. | |
| 2006/0270440 A1 | 11/2006 | Shearer et al. | |
| 2007/0191074 A1 | 8/2007 | Harrist et al. | |
| 2007/0222542 A1 | 9/2007 | Joannopoulos et al. | |
| 2007/0285759 A1 | 12/2007 | Ash et al. | |
| 2008/0042012 A1 | 2/2008 | Callahan et al. | |
| 2008/0166965 A1 | 7/2008 | Greene et al. | |
| 2008/0185918 A1 | 8/2008 | Metz et al. | |
| 2008/0278264 A1 | 11/2008 | Karalis et al. | |
| 2009/0054054 A1 | 2/2009 | Shao et al. | |
| 2009/0122430 A1* | 5/2009 | DeWard | B60R 11/04 359/871 |
| 2009/0153273 A1 | 6/2009 | Chen et al. | |
| 2009/0189458 A1 | 7/2009 | Kawasaki | |
| 2009/0195332 A1 | 8/2009 | Joannopoulos et al. | |
| 2009/0195333 A1 | 8/2009 | Joannopoulos et al. | |
| 2009/0224856 A1 | 9/2009 | Karalis et al. | |
| 2010/0039410 A1 | 2/2010 | Becker et al. | |
| 2010/0039690 A1 | 2/2010 | Agrawal et al. | |
| 2010/0156430 A1 | 6/2010 | Quaini et al. | |
| 2010/0171667 A1 | 7/2010 | Knudsen | |
| 2010/0188057 A1 | 7/2010 | Tarng | |
| 2010/0243427 A1 | 9/2010 | Kozlowski et al. | |
| 2010/0315693 A1 | 12/2010 | Lam et al. | |
| 2011/0051221 A1 | 3/2011 | Veerasamy | |
| 2011/0074342 A1 | 3/2011 | MacLaughlin | |
| 2011/0148218 A1 | 6/2011 | Rozbicki | |
| 2011/0159821 A1 | 6/2011 | Park | |
| 2011/0304898 A1 | 12/2011 | Letocart | |
| 2012/0140492 A1 | 6/2012 | Alvarez | |
| 2012/0190386 A1 | 7/2012 | Anderson | |
| 2012/0194895 A1 | 8/2012 | Podbelski et al. | |
| 2012/0293855 A1 | 11/2012 | Shrivastava | |
| 2013/0157493 A1 | 6/2013 | Brown | |
| 2013/0241299 A1 | 9/2013 | Snyker et al. | |
| 2013/0278989 A1 | 10/2013 | Lam et al. | |
| 2014/0170863 A1 | 6/2014 | Brown | |
| 2015/0155737 A1 | 6/2015 | Mayo | |
| 2015/0160525 A1 | 6/2015 | Shi | |
| 2015/0222126 A1 | 8/2015 | Leabman et al. | |
| 2015/0270724 A1 | 9/2015 | Rozbicki | |
| 2015/0378230 A1 | 12/2015 | Gudmunson et al. | |
| 2015/0378231 A1 | 12/2015 | Greer et al. | |
| 2016/0020647 A1 | 1/2016 | Leabman et al. | |
| 2016/0070151 A1 | 3/2016 | Shrivastava et al. | |
| 2016/0154290 A1 | 6/2016 | Brown et al. | |
| 2016/0183056 A1 | 6/2016 | Leabman | |
| 2016/0248270 A1 | 8/2016 | Zeine et al. | |
| 2017/0117754 A1 | 4/2017 | Noori et al. | |
| 2017/0139301 A1 | 5/2017 | Messere et al. | |
| 2017/0197494 A1 | 7/2017 | Li | |
| 2017/0200424 A1 | 7/2017 | Xu et al. | |
| 2017/0253801 A1 | 9/2017 | Bae et al. | |
| 2017/0269451 A1 | 9/2017 | Shrivastava et al. | |
| 2017/0288468 A1 | 10/2017 | Pearson | |
| 2017/0347129 A1 | 11/2017 | Levi et al. | |
| 2019/0115786 A1 | 4/2019 | Rozbicki | |

FOREIGN PATENT DOCUMENTS

| | | |
|---|---|---|
| EP | 2648086 A2 | 10/2013 |
| EP | 2764998 A1 | 8/2014 |
| EP | 3015915 A1 | 5/2016 |
| JP | S58-091727 | 6/1983 |
| JP | S58-187097 | 6/1983 |
| JP | 2004-12818 | 1/2004 |
| JP | 2004-171008 | 6/2004 |
| JP | 2007-066143 | 3/2007 |
| JP | 2007/169960 A | 7/2007 |
| JP | 2007-252090 | 9/2007 |
| JP | 2008-508842 | 3/2008 |
| JP | 2008-518397 | 5/2008 |
| JP | 2008/148520 A | 6/2008 |
| JP | 2008-154446 | 7/2008 |
| JP | 2008-543255 | 11/2008 |
| JP | 2009-508387 | 2/2009 |
| JP | 2014-204550 A | 10/2014 |
| KR | 10-1799323 B1 | 11/2017 |
| WO | WO 98/08137 | 2/1998 |
| WO | WO07/146862 | 12/2007 |
| WO | WO2008/058881 | 5/2008 |
| WO | WO2012/079159 | 6/2012 |
| WO | WO2014/082092 | 5/2014 |
| WO | WO2014/121809 | 8/2014 |
| WO | WO2015/051262 A1 | 4/2015 |
| WO | WO2017/062915 A1 | 4/2017 |
| WO | WO2018/063919 | 4/2018 |

OTHER PUBLICATIONS

U.S. Office Action dated Jul. 28, 2016 for U.S. Appl. No. 14/735,016.
U.S. Notice of Allowance dated Sep. 21, 2016 for U.S. Appl. No. 14/735,016.
U.S. Notice of Allowance dated Dec. 27, 2016 for U.S. Appl. No. 14/735,016.
U.S. Office Action dated Dec. 31, 2015 in U.S. Appl. No. 14/855,284.
U.S. Notice of Allowance dated Jul. 21, 2016 in U.S. Appl. No. 14/855,284.
International Search Report and Written Opinion dated Feb. 15, 2016 in PCT/US2015/062480.
Japanese Office Action dated Oct. 25, 2016 for JP Application No. 2015-172962.
"SageGlass Unplugged™—wireless dynamic 2014, 2 glass", 2 pages.
"Ossia Wireless Charging", screenshot and picture of Cota device, accessed Apr. 20, 2015, 1 page.
"SageGlass Mobile App" screenshot, accessed Aug. 28, 2015, 1 page.

(56) References Cited

OTHER PUBLICATIONS

"Sage Product Highlights" screenshot, accessed Aug. 28, 2015, 1 page.
"SageGlass Unplugged" screenshot, accessed Aug. 28, 2015, 1 page.
"Power Unplugged" Energous Corp. Product Overview, 2016, 4 pages, <http://www.energous.com/product-overview/>.
"RF Energy Harvesting and Wireless Power for Low-Power Applications", Powercast Corp., 2012 <http://www.powercastco.com/PDF/powercast-overview%20(2012).pdf>.
U.S. Appl. No. 12/645,111, filed Dec. 22, 2009.
U.S. Appl. No. 12/645,159, filed Dec. 22, 2009.
U.S. Appl. No. 12/772,055, filed Apr. 30, 2010.
U.S. Appl. No. 12/772,075, filed Apr. 30, 2010.
U.S. Appl. No. 12/814,277, filed Jun. 11, 2010.
U.S. Appl. No. 12/814,279, filed Jun. 11, 2010.
U.S. Appl. No. 14/855,284, filed Sep. 15, 2015 & Sep. 16, 2015 Preliminary Amendment.
Preliminary Amendment filed Aug. 31, 2015 for U.S. Appl. No. 14/735,016.
U.S. Office Action dated Feb. 19, 2013 for U.S. Appl. No. 12/971,576.
U.S. Final Office Action dated Aug. 15, 2013 for U.S. Appl. No. 12/971,576.
U.S. Office Action dated May 12, 2014 for U.S. Appl. No. 12/971,576.
U.S. Final Office Action dated Oct. 9, 2014 for U.S. Appl. No. 12/971,576.
U.S. Notice of Allowance dated Mar. 11, 2015 for U.S. Appl. No. 12/971,576.
U.S. Office Action dated Sep. 23, 2013 for U.S. Appl. No. 13/479,137.
U.S. Final Office Action dated Jan. 27, 2014 in U.S. Appl. No. 13/479,137.
U.S. Office Action dated Jul. 3, 2014 in U.S. Appl. No. 13/479,137.
U.S. Final Office Action dated Feb. 26, 2015 in U.S. Appl. No. 13/479,137.
U.S. Notice of Allowance dated May 14, 2015 in U.S. Appl. No. 13/479,137.
U.S. Notice of Allowance (supplemental) dated Jun. 12, 2015 in U.S. Appl. No. 13/479,137.
International Search Report and Written Opinion, dated Sep. 14, 2011, issued in PCT/US2010/061091.
International Preliminary Report on Patentability, dated Jul. 5, 2012, in PCT/US2010/061091.
European Search Report, dated Sep. 28, 2012, for EP application No. 10843504.1.
Japanese Office Action dated Sep. 2, 2014 for JP Application No. 2012-546090.
U.S. Appl. No. 62/102,516, filed Jan. 12, 2015, Nagel et al.
U.S. Appl. No. 62/102,515, filed Jan. 12, 2015, Nagar et al.
Preliminary Amendment filed Jun. 8, 2017 for U.S. Appl. No. 15/616,843.
U.S. Notice of Allowance dated Apr. 4, 2017 for U.S. Appl. No. 14/735,016.
U.S. Office Action dated Sep. 11, 2017 in U.S. Appl. No. 14/951,410.
U.S. Final Office Action dated Mar. 15, 2018 in U.S. Appl. No. 14/951,410.
U.S. Office Action dated Aug. 25, 2017 in U.S. Appl. No. 15/616,843.
U.S. Notice of Allowance dated Dec. 14, 2017 in U.S. Appl. No. 15/616,843.
International Preliminary Report on Patentability dated Jun. 8, 2017 in PCT/US2015/062480.
European Office Action dated Jun. 9, 2017 for for EP application No. 10843504.1.
Japanese Office Action dated Sep. 5, 2017 for JP Application No. 2015-172962.
Japanese Decision of Refusal dated Apr. 3, 2018 for JP Application No. 2015-172962.
U.S. Notice of Allowance dated Oct. 22, 2018 in U.S. Appl. No. 14/951,410.
European Extended Search Report dated Dec. 7, 2018 for EP Application No. 18189681.2.
Chinese Office Action dated Aug. 28, 2018 in CN Application No. 201580070776.3.
EP Extended Search Report dated Nov. 8, 2018 in EP Application No. 15863112.7.
International Search Report and Written Opinion dated Feb. 6, 2018 in PCT/US2017/052798.
U.S. Appl. No. 16/212,258, filed Dec. 6, 2018, Rozbicki.
Preliminary Amendment filed Feb. 20, 2019 for U.S. Appl. No. 16/212,258.
CN Office Action dated Mar. 19, 2019 in CN Application No. 201580070776.3.
International Preliminary Report on Patentability dated Apr. 11, 2019 in PCT/US2017/052798.

* cited by examiner

WIRELESS POWERED ELECTROCHROMIC WINDOWS

CROSS-REFERENCE TO RELATED APPLICATIONS

This application is a continuation application of U.S. patent application Ser. No. 14/735,016, filed on Jun. 9, 2015 and titled "WIRELESS POWERED ELECTROCHROMIC WINDOWS," which is a continuation application of U.S. patent application Ser. No. 12/971,576, filed on Dec. 17, 2010 and titled "WIRELESS POWERED ELECTROCHROMIC WINDOWS," which is a non-provisional application of and claims priority to U.S. Provisional Application Ser. No. 61/289,319, filed on Dec. 22, 2009 and titled "WIRELESS POWERED ELECTROCHROMIC WINDOWS;" all of which are hereby incorporated by reference in their entirety and for all purposes.

FIELD OF THE INVENTION

The invention relates generally to the field of electrochromic (EC) devices coupled with wireless power transmission technology. More specifically the invention relates to EC windows powered by wireless power transmission technology.

BACKGROUND

Electrochromism is a phenomenon in which a material exhibits a reversible electrochemically-mediated change in an optical property when placed in a different electronic state, typically by being subjected to a voltage change. The optical property is typically one or more of color, transmittance, absorbance, and reflectance. One well known EC material, for example, is tungsten oxide ($WO_3$). Tungsten oxide is a cathodic EC material in which a coloration transition, transparent to blue, occurs by electrochemical reduction. While electrochromism was discovered in the 1960's, EC devices and apparatus and systems containing EC devices have not begun to realize their full commercial potential.

Electrochromic materials may be incorporated into, for example, windows. One drawback of conventional EC windows is that the power used, although small in amount, requires a hard wired connection to a power source of a building. This creates problems when builders are installing, for example, a large number of windows in an office building. Having to deal with hard wiring required for windows is just another impediment that a builder must deal with in the long list of items necessary to build a modern structure. Also, although EC windows offer an elegant solution in the management of heat zones in a modern building, for example, when controlled by an automated heat and/or energy management system, EC windows that require hard wired power sources create impediments to integration into automated energy management systems. Thus the additional installation costs and risks associated with wires will slow down the adoption of EC windows in new construction and may prevent retrofit applications in many cases because retrofit requires additional installation of wiring infrastructure for the new EC windows.

SUMMARY OF INVENTION

Electrochromic devices, particularly EC windows, powered by wireless power transmission are described. The combination of low-defectivity, highly-reliable EC windows with wireless power transmission is an aspect of the invention.

Scalable EC window technology that integrates wireless power transmission technology to create a wirelessly-powered EC window is described. Such technology may optionally include environmental sensors, wireless control and/or in some aspects photovoltaic power. The invention enables full benefits of EC window technology to be realized at national level savings of quads of energy and hundreds of tons of carbon annually. New construction will benefit greatly from wirelessly powered EC windows, and there is particular advantage in retrofit applications, where installing wires for replacement windows is problematic.

One embodiment is an EC device powered by wireless power transmission. In one embodiment, the EC device is an EC window. Wireless power transmission is utilized to provide power to one or more EC device's in an EC window. Wireless power can be used to directly power an EC device in the window or, in an alternative embodiment, charge an internal battery which powers the EC transitions and/or EC states of the EC device(s) in the window. In one embodiment, wireless power transmission is received by a receiver that powers more than one EC window. Wireless power can also be used to power other active devices which are part of, or directly support, the EC window: for example, motion sensors, light sensors, heat sensors, moisture sensors, wireless communication sensors and the like. Wireless communication technology can also be used to control the wirelessly powered EC window.

Wireless power transmission of any suitable type can be used in conjunction with EC windows. Wireless power transmission includes, for example but not limited to, induction, resonance induction, radio frequency power transfer, microwave power transfer and laser power transfer. In one embodiment, power is transmitted to a receiver via radio frequency, and the receiver converts the power into electrical current utilizing polarized waves, for example circularly polarized, elliptically polarized and/or dual polarized waves, and/or various frequencies and vectors. In another embodiment, power is wirelessly transferred via inductive coupling of magnetic fields. In a specific embodiment, power is wirelessly transferred via a first resonator (a coil that converts electrical energy, e.g. AC, running through the coil into a magnetic field), which receives power from an external supply hard wired to the first resonator, and a second resonator (a coil that is coupled to the magnetic field and thereby produces electrical energy via induction), which acts as the receiver by producing an electric current or potential via coupling of the magnetic resonance fields of the first and second resonators. Although embodiments utilizing magnetic induction need not necessarily use resonance coupled magnetic fields, in those that do, near-field resonance from localized evanescent magnetic field patterns is a relatively efficient method of wireless power transfer.

In one embodiment, the window receiver is an RF antenna. In another embodiment the RF antenna converts RF power into an electrical potential used to function the EC device. In another embodiment the receiver is a second resonator which is resonance coupled to a first resonator, configured so that power is transmitted wirelessly from the first resonator to the second resonator. The second resonator converts the wirelessly transferred power into electricity to power the EC window.

Typically the receiver, whether RF antenna or secondary resonance coil, is located in the frame of the EC window, e.g., near the outer seal of the IGU and/or somewhere in the window frame so as not to obscure the viewable area through the glass of the IGU. Thus, in particular embodiments, the receiver is of relatively small dimensions. In one embodiment, the receiver is of sufficiently small dimensions that the user of the window may not recognize the receiver as being part of the window, but rather the receiver is hidden from the view of the user.

In one embodiment, the wireless power transmission is carried out via a wireless power transmission network which includes one or more power nodes for transmitting power to window receivers in particular areas. Depending on the building or need, one or more, sometimes several nodes are used to form a network of power nodes which feed power to their respective window receivers. In one embodiment, where radio frequency is used to transmit power and there are more than one power node, there are more than one frequency and/or polarization vector used in the power nodes, so that different levels or types of power are transferred from the various nodes to windows having different power needs. In another embodiment, where magnetic induction is used for wireless power transfer, there also are one or more power nodes, but in this embodiment, the power nodes are themselves resonators. For example, in one embodiment, a first resonator, which receives power via a power supply, is resonance coupled to a second resonator, and the second resonator is resonance coupled to a third resonator, for example that delivers power to an EC window. In this way, the second resonator acts as a power node in a power transfer network from the first resonator, to the second resonator, to the third resonator, the third resonator acting as the receiver and transmitting power to the EC window via conversion of magnetic field to electrical power.

Another aspect of the invention is a method of powering an EC device, the method including: i) generating and/or transmitting a wireless power to a receiver, said receiver configured to convert the wireless power to electrical energy (e.g., electrical current or potential) used to power the EC device; and ii) delivering the electrical energy to the EC device. In one embodiment, the EC device is an EC window as described above. In another embodiment, i) is performed via RF; in another embodiment, i) is performed via magnetic induction. In one embodiment, the electrical energy from the receiver is used to charge a battery, which in turn is used to power to the EC device(s) of the EC window. In one embodiment, a single window has a wireless power receiver, and the electrical energy created by the receiver is used to power more than one EC window, directly and/or by charging a battery or system of batteries associated with the windows.

Another aspect of the invention is a wireless power transmission network including: i) a wireless power transmitter configured to transmit a wireless power; ii) a power node, configured to receive the wireless power and relay the wireless power; iii) a receiver configured to receive the relayed wireless power and convert the wireless power to an electrical energy; and, iv) an EC device configured to receive the electrical energy to power a transition between optical states and/or maintain an optical state. The electrical energy can be received by the EC device either directly or indirectly. In one embodiment, the electrical energy is received directly from the receiver, in another embodiment, the electrical energy is directed from the receiver to a battery, and then to the EC device. In one embodiment, the EC device is part of an EC window.

In certain embodiments, the EC device receives some of its electrical energy from a wireless power source as described above and additional electrical energy from a photovoltaic source that may optionally be integrated with the EC device (e.g., in or near an IGU, for example in a window frame). Such systems may require no wiring to power the EC device and associated controller, sensors and the like.

These and other features and advantages will be described in further detail below, with reference to the associated drawings.

BRIEF DESCRIPTION OF THE DRAWINGS

The following detailed description can be more fully understood when considered in conjunction with the drawings in which.

DETAILED DESCRIPTION

In the broadest sense, the invention describes an EC device powered by a wireless power transmission source. In more specific embodiments, EC windows are powered by wireless power sources. Wireless power transmission is particularly well suited for supplying EC windows, because EC windows typically function using low potentials, on the order of a few volts to transition an EC device and/or maintain the device's optical state. Typically, EC windows are transitioned only a few times per day. Also, wireless power transmission can be used to charge an associated battery, so that indirect powering of one or more EC windows via wireless power transmission is achieved.

Installing windows with wires entails further considerations for the architect and builder, and in retrofit applications wires are particularly problematic due to the need for additional wiring infrastructure that was not previously installed in the building. The combination of these advanced technologies, wireless power transmission and EC windows, solves these problems and provides a synergy that saves energy, as well as time and money that would be spent integrating hard wire electrical connections of EC windows.

Dynamic, EC, insulated glass units (IGU's) for commercial and residential windows change light transmission properties in response to a small voltage, allowing control of the amount of light and heat passing through the windows. The EC device changes between a transparent "clear or bleached" state and a darkened (light and/or heat blocking) state using small potentials and can maintain optical states with even less power. Dynamic EC windows can filter the amount of light passing through the window, in one aspect providing visibility even in its darkened state and thus preserving visual contact with the outside environment while saving energy by, for example, blocking out heat generating solar rays during hot weather or keeping valuable heat in a building due to their insulating properties during cold weather.

One example of such dynamic windows are low-defectivity, highly-reliable EC windows which include solid-state EC stack materials. Such all solid-state and inorganic EC devices, methods of fabricating them, and defectivity criterion are described in more detail in U.S. patent application, Ser. No. 12/645,111, entitled, "Fabrication of Low-Defectivity Electrochromic Devices," filed on Dec. 22, 2009 and naming Mark Kozlowski et al. as inventors; and in U.S. patent application, Ser. No. 12/645,159, entitled, "Electrochromic Devices," filed on Dec. 22, 2009 and naming Zhongchun Wang et al. as inventors; and in U.S. patent applications, Ser. Nos. 12/772,055 and 12/772,075, each filed on Apr. 30, 2010, and in U.S. patent applications, Ser. Nos. 12/814,277 and 12/814,279, each filed on Jun. 11, 2010—each of the four applications is entitled "Electrochromic Devices," each names Zhongchun Wang et al. as inventors, each of these six patent applications is incorporated by reference herein for all purposes. One aspect of the invention is a combination of an EC window, for example, but not limited to, an EC window described in any of these six U.S. patent applications, powered by wireless power transmission technology. The window may be powered directly via wireless power transmission, after conversion by a receiver to electrical energy, and/or the electrical energy may be used to charge a battery that is used to power the window.

Wireless power transmission is the process that takes place where electrical energy is transmitted from a power source to an electrical load, without interconnecting wires. In the broadest sense, electrical current can pass through the environment, be it air, water or solid objects without the need for wires. But more useful (controlled) forms of wireless power transmission exist, for example transmitting power via RF, magnetic induction, lasers or microwave energy. Wireless transmission finds particular use in applications where instantaneous or continuous energy transfer is needed, but interconnecting wires are inconvenient, problematic, hazardous, or impossible. Wireless power transfer may be inductive, including electrodynamic induction, or based upon other known energy transfer mediums such as radio frequency (RF), microwaves and lasers.

In some embodiments, power is transferred via RF, and transformed into electrical potential or current by a receiver in electrical communication with an EC device, particularly an EC window. One particularly useful method of transferring power via RF is described in US Patent Publication 2007/0191074, from application Ser. No. 11/699,148 filed Jan. 29, 2007, entitled "Power Transmission Network and Method," by Daniel W. Harrist, et al., which is herein incorporated by reference for all purposes.

In other embodiments, power is transferred via magnetic induction using a first resonator powered by an external power supply and a second resonator which converts the magnetic field energy created by the first resonator into power that supplies the EC device of the EC window. One particularly useful method of transferring power via magnetic induction is described in US Patent Publication 2007/0222542, from application Ser. No. 11/481,077 filed Jul. 5, 2006, entitled "Wireless Non-radiative Energy Transfer," by John Joannapoulos, et al., which is herein incorporated by reference for all purposes. Another useful method of controlling wireless inductive power is described in U.S. Pat. No. 7,382,636, filed Oct. 14, 2005, entitled "System and Method for Powering a Load," by David Baarman, et al., which is herein incorporated by reference for all purposes. EC windows described herein can incorporate such methods of controlling wireless power transmission.

Certain embodiments include more than one wireless power transmission source, that is, the invention is not limited to embodiments where a single wireless power transmission source is used. For example, in embodiments were a wireless power transmission network is used, one wireless power transmission method, for example RF power transmission, is used in part of the network, while another method, for example, magnetic induction, is used in another part of the network.

One aspect of the invention is an EC window powered by a wireless power transmission source. In one embodiment, the EC window can be of any useful size, e.g., in automotive use, such as in a sunroof or a rear view mirror where wiring is inconvenient, for example having to pass through a windshield of a car. In one embodiment, the EC window uses architectural scale glass as a substrate for the EC device of the window. Architectural glass is glass that is used as a building material. Architectural glass is typically used in commercial buildings, but may also be used in residential buildings and typically, but not necessarily, separates an indoor environment from an outdoor environment. Architectural glass is at least 20 inches by 20 inches, and can be as large as about 80 inches by 80 inches. In some embodiments, the EC device is all solid state and inorganic. The window will have a receiver, for example an RF receiver or resonator, as part of a window assembly.

Figure 1:
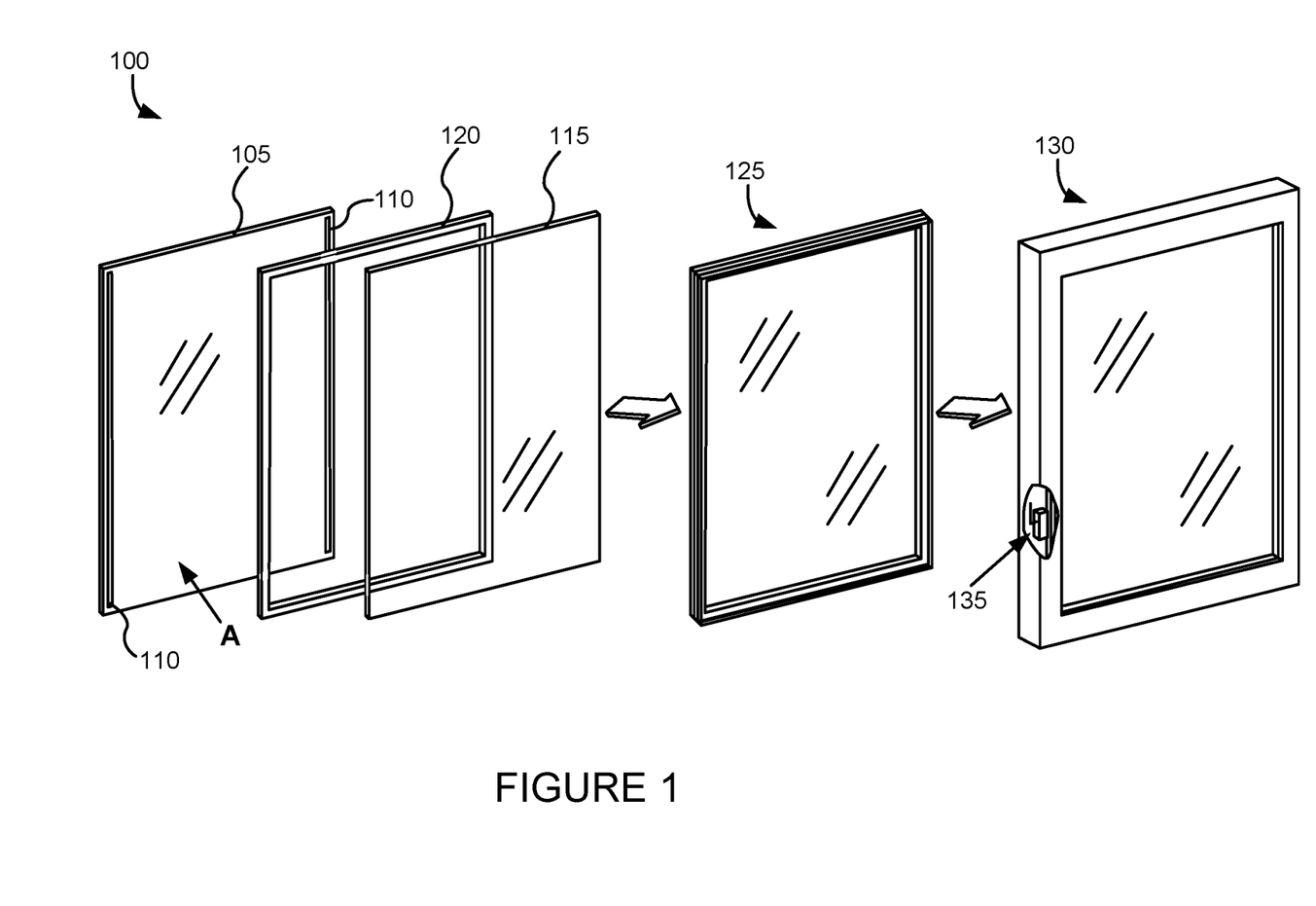
FIG. 1 depicts EC window fabrication including a wireless power receiver.

FIG. 1 depicts an EC window fabrication, 100, where the window assembly includes a receiver, 135, for receiving wireless power transmissions, converting the transmissions to an electrical energy and powering an EC device of the window with the electrical energy, either directly or indirectly, for example, via powering the EC device directly or charging a battery that is used to power the EC window. An EC pane, 105, having an EC device (not shown, but for example on surface A) and bus bars, 110, which power the EC device, is matched with another glass pane, 115. During fabrication of IGU, 125, a separator, 120, is sandwiched in between and registered with substrates 105 and 115. IGU 125 has an associated interior space defined by the faces of the substrates in contact with separator 120 and the surfaces of the interior perimeter of separator 120. Separator 120 is typically a sealing separator, that is, includes a spacer and sealing between the spacer and each substrate where they adjoin in order to hermetically seal the interior region and thus protect the interior from moisture and the like. Typically, once the glass panes are sealed to the separator, secondary sealing may be applied around the outer perimeter edges separator 120 of the IGU in order to impart not only further sealing from the ambient, but also further structural rigidity to the IGU. The IGU is supported by a frame to create a window assembly, 130. A cut out of the window frame is shown to reveal wireless power receiver 135 which includes an antennae in this example. Receiver 135 is proximate the IGU, in this example, inside the frame of window assembly 130. The wireless power transmission receiver may be a component of a window controller.

In one embodiment, the wireless power transmission source transmits power via a radio frequency. In such embodiments, the EC window includes a radio frequency receiver, where the radio frequency receiver configured to convert the radio frequency to electrical energy (e.g., an electrical current or potential) used to power an EC device in the EC window. Powering the EC device includes at least one of powering an optical transition or an optical state of the EC device. In one embodiment, the radio frequency receiver resides in or near the IGU of the EC window. For example, the receiver can be in the window frame that supports the IGU, in an area near the spacer that separates the glass panes of the IGU, or both. Preferably, but not necessarily, the receiver does not obscure the viewable area of the IGU, for example, as depicted in FIG. 1.

In another embodiment, power is wirelessly transferred via inductive coupling of magnetic fields. In general terms, a primary coil (that converts electrical energy, e.g. AC, running through the coil into a magnetic field) supplied by a power source generates a magnetic field and a secondary coil is coupled to the magnetic field and thereby produces electrical energy via induction. The electrical energy produced by the secondary coil is used to power the EC device, in particular embodiments an EC device of an EC window. In a specific embodiment where resonance coupled magnetic energy is utilized, power is wirelessly transferred via a first resonator, which receives power from an external supply hard wired to the first resonator, and a second resonator, which acts as the receiver by producing an electric current via coupling of the magnetic resonance fields of the first and second resonators. Although embodiments utilizing magnetic induction need not necessarily use resonance coupled magnetic fields, in those that do, near-field resonance from localized evanescent magnetic field patterns is a relatively efficient method of wireless power transfer.

In one embodiment, the receiver, whether RF antenna or resonance coil, is located proximate the IGU of the EC window, e.g., near the IGU seal or the window frame so as not to obscure the viewable area through the glass of the IGU. Thus, in particular embodiments, the receiver is of relatively small dimensions. "Small dimensions" means, for example, that the receiver occupies not more than about 5% of the viewable area of the EC window. In one embodiment, the receiver occupies none of the viewable area of the EC window, that is, the receiver is of sufficiently small dimensions that the user of the window may not recognize the receiver as being part of the window, but rather the receiver is hidden from the view of the user, e.g. housed in the frame of the window. In one embodiment, where the receiver is housed in seal area of the IGU, the frame of the window can have one or more access ports for servicing the receiver or the receiver can be sealed permanently in the window frame. There may also be ports and/or materials transparent to the wireless power transmission, so that the receiver can properly receive the wireless power transmissions without interference from the window frame material.

In particular embodiments, there is a controller, for example a microprocessor, that regulates the potential applied to the EC device and may optionally control other functions (alone or combined with other microprocessors) such as recharging a battery used to function the window, wirelessly communicating with a remote control, such as a hand held, an automated heat and/or energy management system that communicates wirelessly with the window controller.

In one embodiment, the wireless power transmission is carried out via a network which includes one or more power nodes for transmitting power to window receivers in particular areas. Wireless power transmission networks described herein can use RF, magnetic induction or both, depending on the need. Depending on the building, one or more, sometimes several nodes are used to form a network of power nodes which feed power to their respective window receivers. In one embodiment, where radio frequency is used to transmit power and there are more than one power node, there are more than one frequency and/or polarization vector used in the power nodes, so that different levels or types of power are transferred from the various nodes to windows having different power needs.

In one embodiment, where magnetic induction is used for wireless power transfer, there also are one or more power nodes, but in this embodiment, the power nodes are themselves resonators. For example, in one embodiment, a first resonator, which receives power via a power supply, is resonance coupled to a second resonator, and the second resonator is resonance coupled to a third resonator, for example that delivers power to an EC window. In this way, the second resonator acts as a power node in a power transfer network from the first resonator, to the second resonator, to the third resonator, the third resonator acting as the receiver and transmitting power to the EC window via conversion of magnetic field to electrical power. In this way, near field magnetic energy can span longer distances in order to suit the needs of the particular building's EC windows.

Another embodiment is a method of powering an EC device, the method comprising: i) generating a wireless power; ii) transmitting the wireless power to a receiver; said receiver configured to convert the wireless power to an electrical energy used to power the EC device; and iii) delivering the electrical energy (e.g., current or potential) to the EC device and/or a battery used to power the EC device. In one embodiment, the EC device is an EC window. In other embodiments, generating the wireless power is performed via a wireless power transmitter that transmits power via a radio frequency and the electrical energy is a voltage potential. In another embodiment, generating the wireless power is performed via a wireless power transmitter that transmits power via magnetic induction, in a more particular embodiment, resonance coupled magnetic induction. In other particular embodiments, ii) and iii) are accomplished via at least one of the wireless power transmission networks as described above. In one particular embodiment of the above described embodiments, the EC device is part of an EC pane of an EC window. In an even more particular embodiment, the EC pane is of architectural glass scale. In another embodiment, at least one of i), ii) and iii) are performed via wireless communication. One embodiment includes using the electrical energy created by the receiver's conversion of wireless power transmission for charging a battery that is used to power the EC device.

Figure 2A:
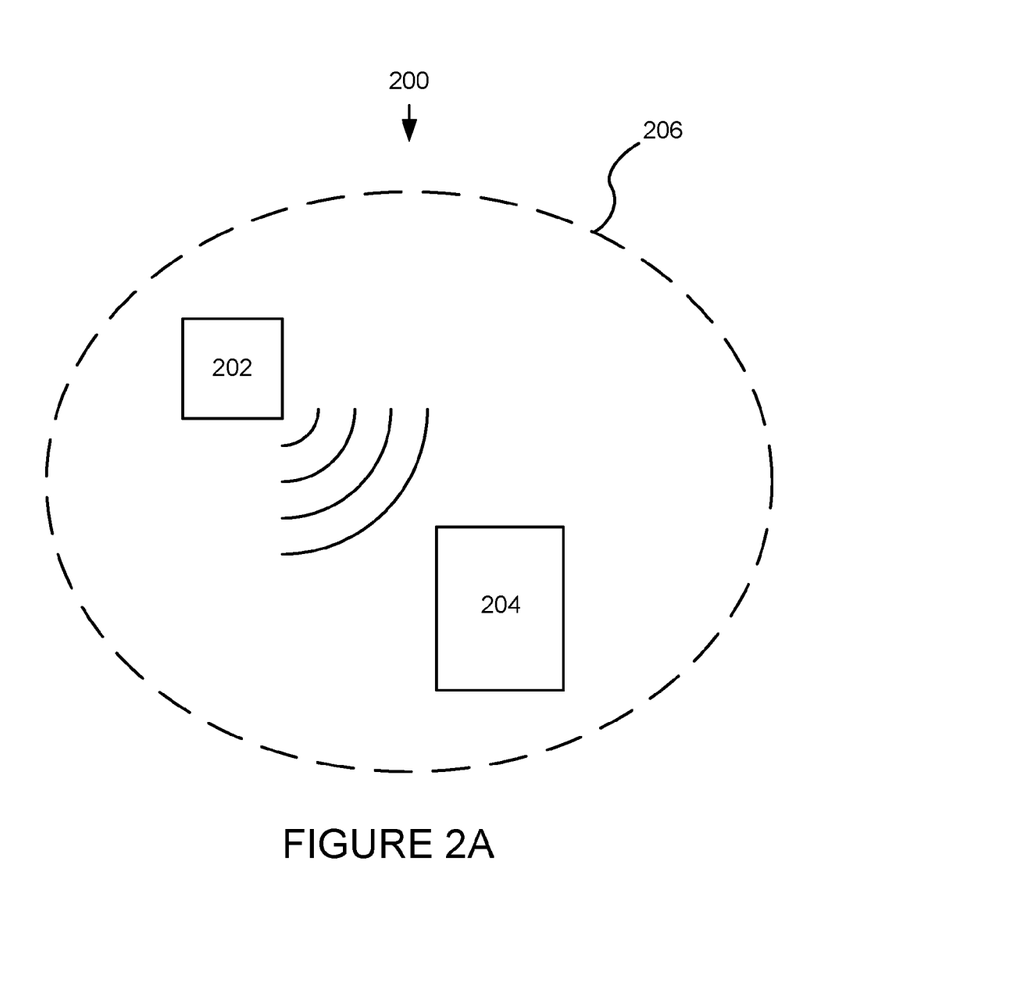
FIGS. 2A-2E are schematic representations of wireless power transmission networks as described herein.

FIG. 2A is a schematic representation of a wireless power transmission network, 200. The wireless power transmission network has a wireless power transmitter, 202, that transmits wireless power, for example via RF power or magnetic induction as described herein, to an EC window 204. The invention is not limited to EC windows, any EC device powered by wireless power transmission is within the scope of the invention. Electrochromic window 204 is configured with a receiver that converts the wirelessly transmitted power to electrical energy that is used to operate the EC device in the EC window and/or window controllers, sensors and the like. In one embodiment, the electrical energy is a voltage potential used to power the EC device's transitions and/or maintain optical states. Typically, the EC device will have an associated controller, e.g. a microprocessor that controls and manages the device depending on the input. Additionally, the EC device can be controlled and managed by an external controller which communicates with the device via a network. The input can be manually input by a user, either directly or via wireless communication, or the input can be from an automated heat and/or energy management system of a building of which the EC window is a component.

The wireless power transmission network is generally defined by area, 206, that is, transmission of power generally is localized to area 206, but not necessarily so. Area 206 can define an area where one or more windows reside and where wireless power will be transmitted. Transmitter 202 can be outside area 206 in some embodiments (and transmit power into the area) or inside area 206 as depicted in FIG. 2. In one embodiment, the wireless power receiver resides proximate the IGU of the EC window. Preferably the receiver does not obstruct the view through the EC window. One of ordinary skill in the art would appreciate that a wireless power network as described can contain a plurality of EC windows to which power is supplied wirelessly via one or more transmitters. Also, the electrical energy produced via the wireless power can be used to augment a battery supply or a photovoltaic power supply in the EC window. In one embodiment, the photovoltaic power supply is used to augment battery charging performed via wireless power transmission.

Figure 2B:
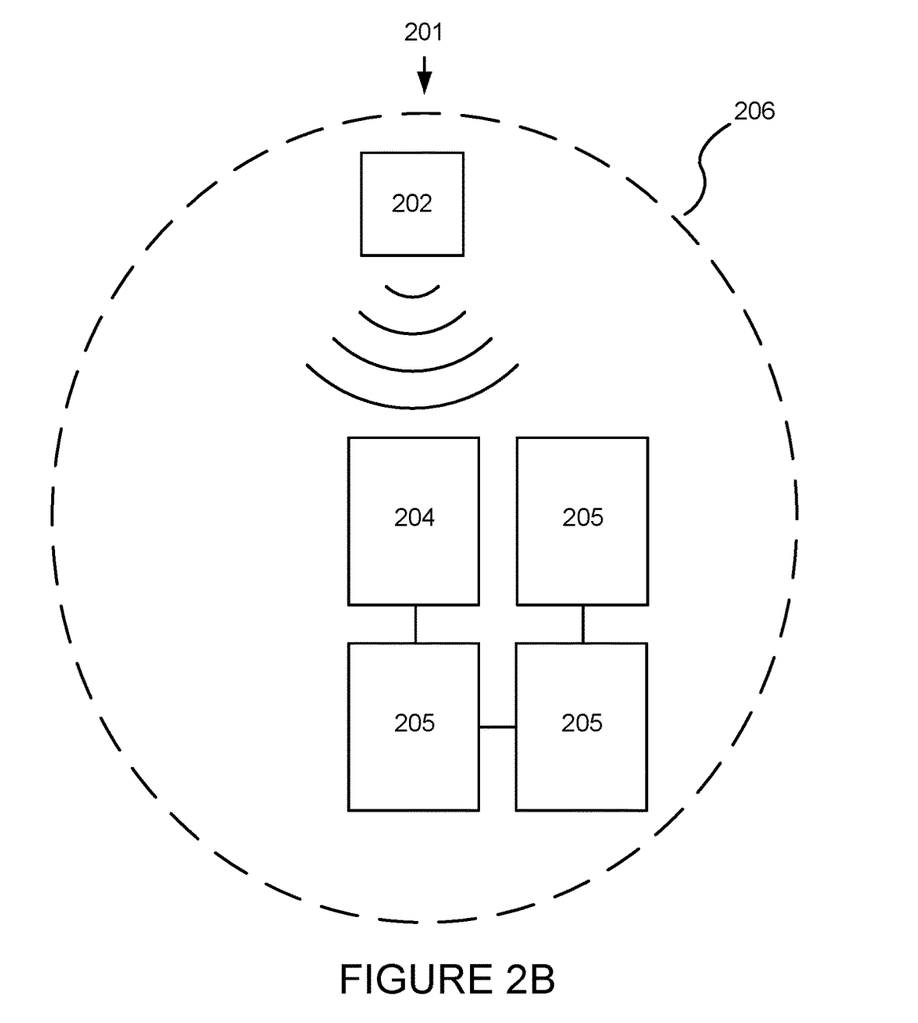

FIG. 2B is a schematic representation of another wireless power transmission network, 201. Network 201 is much like network 200 as described above in relation to FIG. 2A, except that the wireless power transmitted from transmitter 202 that is received by a receiver in EC window 204 is used to power not only window 204 but also windows 205. That is, the receiver in a single window is configured to convert wireless power transmissions into electrical energy in order to power more than one EC window, either directly or via a battery or batteries that are charged by the receiver. In this example, a receiver associated with window 204 converts the wireless power transmissions into electrical energy and transfers the energy via wires to windows 205. This has the advantage of not relying on a receiver for each window, and, although some wiring is used, it is localized to the window installation area, providing electrical communication between the windows, rather than having to be run throughout a building. Also, since EC windows do not have high power requirements, this configuration is practical.

Figure 2C:
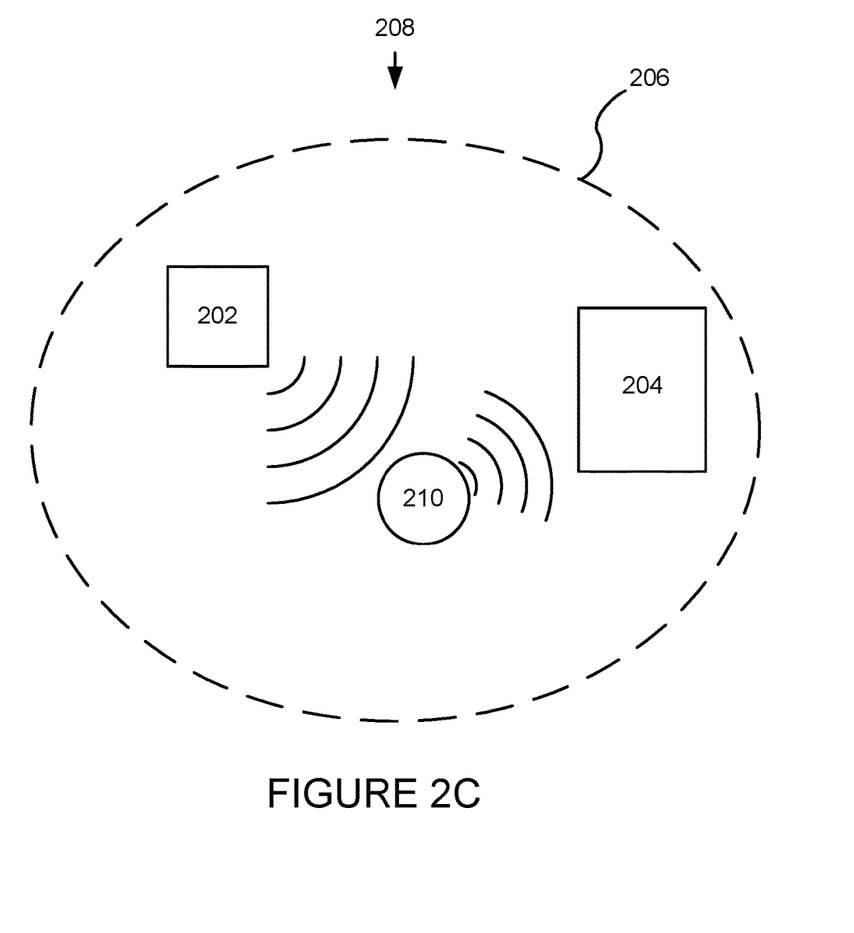

FIG. 2C is a schematic representation of another wireless power transmission network, 208. Network 208 is much like network 200 as described above in relation to FIG. 2A, except that the wireless power transmitted from transmitter 202 is not received directly by a receiver in EC window 204, but rather relayed via a power node 210. Power node 210 can either relay the power in the same form as that which it received (e.g. via an RF antenna or induction coil) or be configured to change the wireless power and transmit it to the receiver in a form more suited to the (ultimate) requirements of window 204. In one example, the power node receives the wireless power transmission in one form, either RF or magnetic induction, and transmits wireless power to window 204 in the other of the other of the aforementioned forms. One embodiment is power node including: a wireless power transmission receiver; configured to receive wireless power transmissions in one or more forms and convert the transmissions to electrical energy; and a wireless power transmitter configured to convert the electrical energy into wireless power transmissions in said one or more forms. In one embodiment, the wireless power transmitter is configured to convert the electrical energy into the same form of wireless power transmission than the wireless power receiver is configured to receive. Although the form is the same, there may be, for example, different frequency or polarity used so that the receiver of the power node can distinguish between the wireless transmissions from transmitter 202 and the transmitter of the power node 210. In one embodiment, the wireless power transmitter is configured to convert the electrical energy into a different form of wireless power transmission than the wireless power receiver is configured to receive.

Figure 2D:
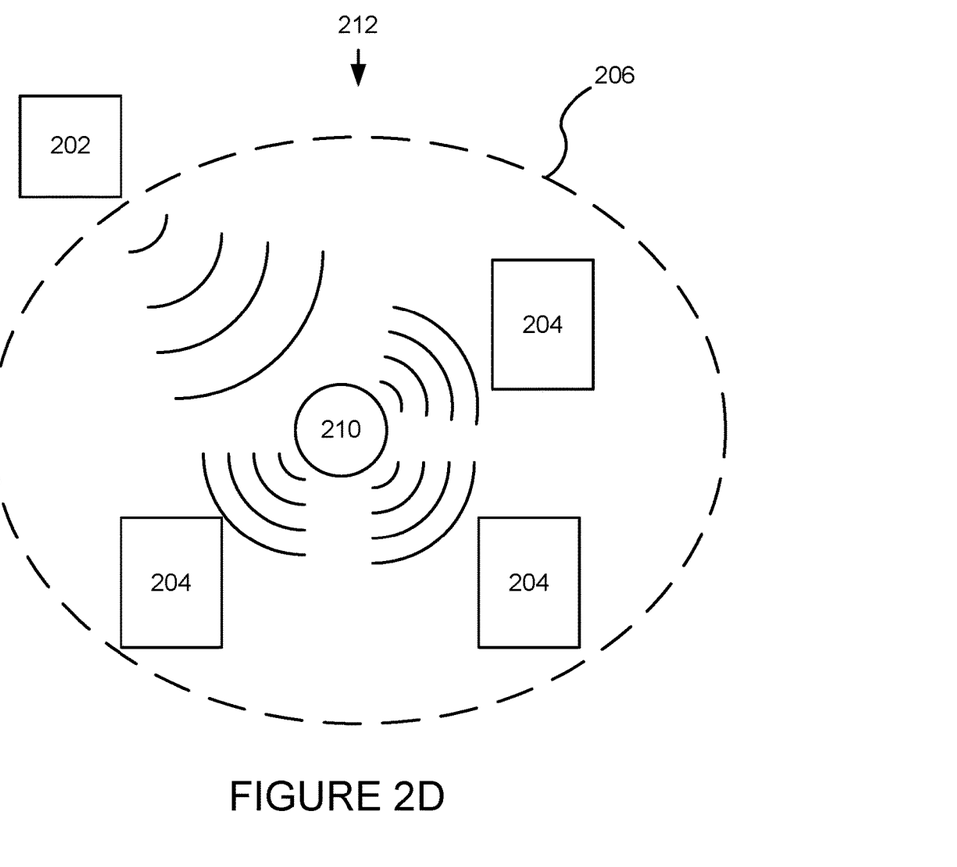

FIG. 2D is a schematic representation of another wireless power transmission network, 212. Network 212 is much like network 208 as described above in relation to FIG. 2C, except that the wireless power transmitted from transmitter 202 is relayed via a power node 210 to a plurality of windows 204. Again, power node 210 can either relay the power in the same form as that which it received (e.g. via an RF antenna or induction coil) or be configured to change the wireless power and transmit it to the receiver in a form more suited to the (ultimate) requirements of windows 204. In this example, transmitter 202 is outside of area 206. In this example, the power requirements of windows 204 are the same, however the invention is not so limited. That is, the wireless power transmitted from node 210 can be of a sufficient level so as to satisfy the power requirements of EC windows having different power needs, for example, where components for appropriately converting the wireless power transmissions from power node 210 to electrical energy are part of each window 204's receiver.

Figure 2E:
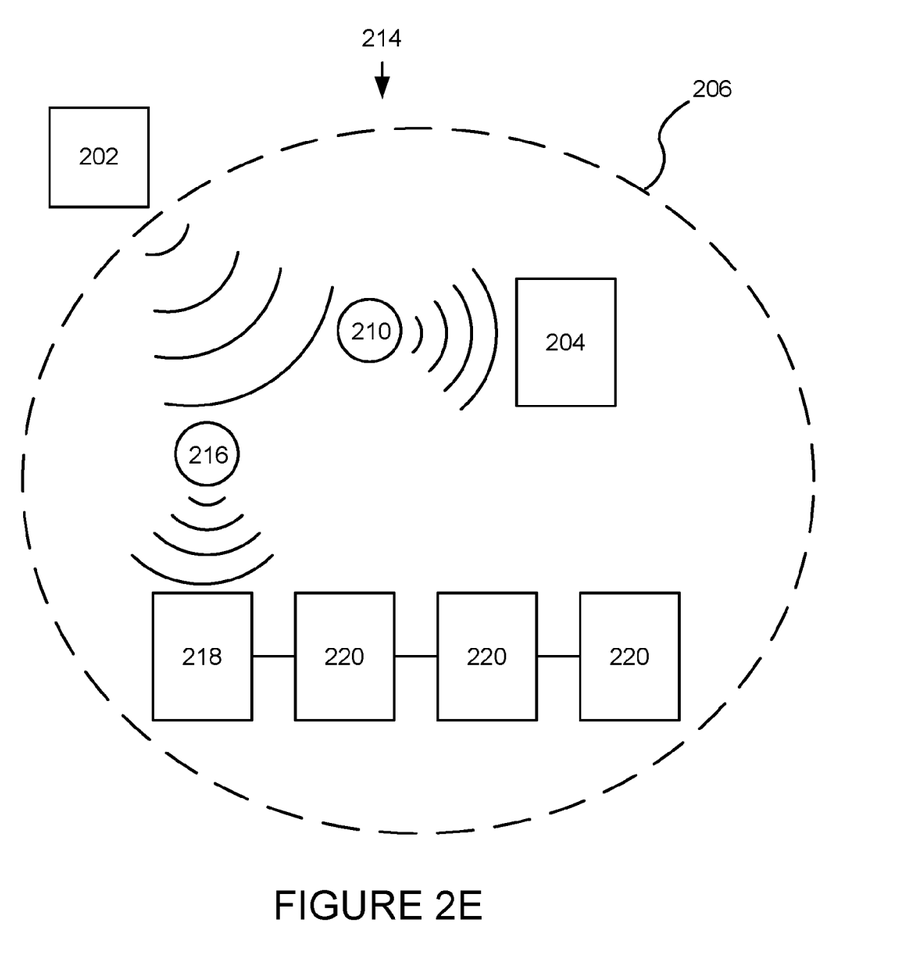

In one embodiment fulfilling the varying power requirements of different windows within a wireless power transmission network is accomplished using different power nodes for windows with different power needs. The power relayed from each node can be, for example, of different power level and/or transmitted in a different way. FIG. 2E is a schematic representation of one such wireless power transmission network, 214. Network 214 is much like network 212 as described above in relation to FIG. 2D, except that the wireless power transmitted from transmitter 202 is relayed via two power nodes, 210 and 216. Power node 210 can either relay the power in the same form as that which it received (e.g. via an RF antenna or induction coil) or be configured to change the wireless power and transmit it to the receiver (in window 204) in a form more suited to the (ultimate) requirements of window 204. Power node 216 relays the wireless power in a manner different than power node 210, that is power node 216 is configured to change the wireless power and transmit it to the receiver in window 218 in a form more suited to the (ultimate) requirements of window 218. In this example, window 218 is configured to supply power to itself and to windows 220 through wiring. Window 218 receives wireless power transmissions from node 216 and the receiver of window 218 converts the wireless power transmission into sufficient power to operate window 218 and windows 220. Thus, in embodiments described herein, different power nodes can receive the same form of wireless energy, for example from a single transmitter, but relay the wireless energy in different formats for different EC devices (via associated receivers), in this example EC windows having different power requirements. In this example, transmitter 202 is outside of area 206. In a specific embodiment, a single wireless power transmitter transmits a wireless power and each of a plurality of EC windows includes a receiver specifically configured to convert the wireless power to an electrical energy suited for the particular needs of that window. In another embodiment, each window has an equivalent receiver that converts the wireless power into the same electrical energy, but the electrical energy is converted to the particular needs of the window by one or more electronic components, in communication with the receiver, for example a rectifier, voltage converter, frequency changer, transformer, or inverter.

One embodiment is a wireless power transmission network including: i) a wireless power transmitter configured to transmit a wireless power; ii) a power node, configured to receive the wireless power and relay the wireless power; iii) a receiver configured to receive the relayed wireless power and convert the wireless power to an electrical energy; and iv) an EC device configured to receive the electrical energy. In one embodiment, the EC device is an EC window. In another embodiment the power node comprises an RF antenna. In one embodiment, the power node comprises an induction coil. In another embodiment the receiver is an RF receiver. In another embodiment, the receiver is an induction coil. In other embodiments, the power node is configured to change the wireless power prior to relaying the wireless power to the EC window, depending on the requirements of the EC window. In some embodiments, the wireless power network includes a plurality of power nodes wherein each power node is configured to relay power to one or more EC windows, each of the plurality of power nodes configured to relay wireless power according to the requirements of the EC windows comprising receivers corresponding to said each of the plurality of power nodes.

Although the foregoing invention has been described in some detail to facilitate understanding, the described embodiments are to be considered illustrative and not limiting. It will be apparent to one of ordinary skill in the art that certain changes and modifications can be practiced within the scope of the appended claims.

What is claimed is:

1. A system comprising:
   an electrochromic window including an electrochromic device; and
   a photovoltaic power supply configured to generate power for the electrochromic window;
   wherein the electrochromic device is configured to be controlled to change between a bleached state and a darkened state by a window controller via wireless communication, and wherein the window controller communicates with the electrochromic device via a network.

2. The system of claim 1, further comprising a battery configured to deliver power to the electrochromic device.

3. The system of claim 2, wherein the photovoltaic power supply is configured to charge the battery.

4. The system of claim 3, wherein the window controller is further configured to control charging of the battery.

5. The system of claim 1, wherein the electrochromic window is in the form of an insulated glass unit.

6. The system of claim 3, wherein the photovoltaic power supply is in or near the insulated glass unit.

7. The system of claim 1, wherein the photovoltaic power supply is in the electrochromic window.

8. The system of claim 1, further comprising a receiver configured to convert wireless power transmissions received from a wirelessly transmitted power supply to electrical energy.

9. The system of claim 8, further comprising a battery configured to deliver power to the electrochromic device, wherein both the photovoltaic power supply and the wirelessly transmitted power supply are configured to deliver power to the battery.

10. The system of claim 8, wherein the system has no external wiring for supplying power to the system.

11. The system of claim 8, wherein the wirelessly transmitted power supply transmits power via magnetic induction, radio frequency, microwave energy or laser.

12. The system of claim 1, further comprising one or more sensors.

13. The system of claim 12, wherein the one or more sensors comprise one or more of a motion sensor, a light sensor, a heat sensor and a moisture sensor.

14. The system of claim 1, wherein the electrochromic device comprising a solid state and inorganic stack materials disposed on a glass substrate.

15. The system of claim 8, wherein wirelessly transmitted power supply transmits power via a power transmission network.

16. The system of claim 1, wherein the electrochromic window is a component of an automated heat and/or energy management system of a building.

17. The system of claim 8, wherein the window controller comprises the wireless power transmission receiver.

18. The system of claim 1, wherein the window controller comprises a microprocessor configured to regulate a potential applied to the electrochromic device.

19. The system of claim 18, wherein the microprocessor, alone or combined with other microprocessors, controls recharging the battery or wirelessly communicating with a remote control.

20. The system of claim 19, wherein the remote control is a hand held device or an automated heat and/or energy management system.

21. The system of claim 1, wherein the window controller controls the electrochromic device depending on input received via wireless communication.

22. The system of claim 21, wherein the input is from an automated energy management system of the building.

23. The system of claim 22, wherein the electrochromic window is a component of the automated energy management system.

24. A method of powering an electrochromic window, the method comprising:
   generating power for the electrochromic window using a photovoltaic power supply; and
   controlling an optical transition between a bleached state and a darkened state in the electrochromic device via wireless communication from a window controller, wherein the window controller communicates with the electrochromic device via a network.

25. The method of claim 24, wherein the optical transition is controlled based on input from an automated energy management system of the building with the electrochromic window.

26. The method of claim 24, further comprising delivering power to the electrochromic device from a battery in the electrochromic window.

27. The method of claim 26, further comprising charging the battery using power generated by the photovoltaic power supply.

28. The method of claim 26, further comprising controlling the charging of the battery using power generated by the photovoltaic power supply.

29. The method of claim 24, wherein the electrochromic window is in the form of an insulated glass unit.

30. The method of claim 24, further comprising receiving wireless power transmissions at a receiver from a wirelessly transmitted power supply and converting the wireless power transmissions into an electrical energy used to power the optical transition in the electrochromic device.

31. The method of claim 30, further comprising charging the battery using power from both the photovoltaic power supply and the wirelessly transmitted power supply.

32. The method of claim 30, wherein the wireless power transmissions are transmitted from the wirelessly transmitted power supply via magnetic induction, radio frequency, microwave energy or laser.

33. The method of claim 24, wherein the electrochromic device comprises a solid-state electrochromic stack materials disposed on a glass substrate.

* * * * *